United States Patent
Wakui

(10) Patent No.: US 11,900,249 B2
(45) Date of Patent: Feb. 13, 2024

(54) MINI-BATCH LEARNING APPARATUS, OPERATION PROGRAM OF MINI-BATCH LEARNING APPARATUS, OPERATION METHOD OF MINI-BATCH LEARNING APPARATUS, AND IMAGE PROCESSING APPARATUS

(71) Applicant: FUJIFILM Corporation, Tokyo (JP)

(72) Inventor: Takashi Wakui, Ashigarakami-gun (JP)

(73) Assignee: FUJIFILM Corporation, Tokyo (JP)

(*) Notice: Subject to any disclaimer, the term of this patent is extended or adjusted under 35 U.S.C. 154(b) by 419 days.

(21) Appl. No.: 17/336,807

(22) Filed: Jun. 2, 2021

(65) Prior Publication Data

US 2021/0287042 A1  Sep. 16, 2021

Related U.S. Application Data

(63) Continuation of application No. PCT/JP2019/042935, filed on Oct. 31, 2019.

(30) Foreign Application Priority Data

Dec. 14, 2018 (JP) ................................. 2018-234881

(51) Int. Cl.
*G06N 3/08* (2023.01)
*G06T 7/11* (2017.01)
(Continued)

(52) U.S. Cl.
CPC ............. *G06N 3/08* (2013.01); *G06F 18/214* (2023.01); *G06F 18/2431* (2023.01);
(Continued)

(58) Field of Classification Search
CPC .......... G06N 3/08; G06N 20/00; G06N 3/045; G06N 3/084; G06N 3/048; G06F 18/214;
(Continued)

(56) References Cited

U.S. PATENT DOCUMENTS 10,019,654 B1 * 7/2018 Pisoni .................... G06V 10/82
10,504,027 B1 * 12/2019 Kim ....................... G06N 3/045
(Continued)

FOREIGN PATENT DOCUMENTS

| JP | 2017-107386 A | 6/2017 |
| JP | 2017-162456 A | 9/2017 |
| WO | WO 2018/081537 A1 | 5/2018 |

OTHER PUBLICATIONS

Bokhorst et al., "Learning from sparsely annotated data for semantic segmentation in histopathology images," Proceedings of Machine Learning Research, vol. 102, 2019, pp. 84-91.
(Continued)

*Primary Examiner* — Michael S Osinski
(74) *Attorney, Agent, or Firm* — Birch, Stewart, Kolasch & Birch, LLP

(57) ABSTRACT

In a case where the operation program is started, a CPU of the mini-batch learning apparatus functions as a calculation unit, a specifying unit, and an update unit. The calculation unit calculates an area ratio of each of a plurality of classes in mini-batch data. The specifying unit specifies a rare class of which the area ratio is lower than a setting value. The update unit sets an update level of the machine learning model in a case where the rare class is specified by the specifying unit to be lower than an update level of the machine learning model in a case where the rare class is not specified by the specifying unit.

7 Claims, 14 Drawing Sheets

(51) Int. Cl.
*G06N 20/00* (2019.01)
*G06V 30/262* (2022.01)
*G06F 18/214* (2023.01)
*G06F 18/2431* (2023.01)
*G06V 30/19* (2022.01)
*G06V 10/82* (2022.01)
*G06V 20/69* (2022.01)

(52) U.S. Cl.
CPC ............ *G06N 20/00* (2019.01); *G06T 7/11* (2017.01); *G06V 10/82* (2022.01); *G06V 20/698* (2022.01); *G06V 30/19147* (2022.01); *G06V 30/19173* (2022.01); *G06V 30/274* (2022.01); *G06T 2207/20081* (2013.01)

(58) Field of Classification Search
CPC .............. G06F 18/2431; G06T 7/11; G06T 2207/20081; G06T 2207/10056; G06T 2207/20084; G06T 7/00; G06T 7/0012; G06T 2207/30024; G06T 2207/20076; G06T 7/143; G06T 2207/20021; G06T 2207/30096; G06V 10/82; G06V 20/698; G06V 30/19147; G06V 30/19173; G06V 30/274; G06V 10/764; G06V 10/454; G06V 2201/03; G06V 10/26; G06V 10/774; G06V 20/695; G06V 10/25
See application file for complete search history.

(56) References Cited

U.S. PATENT DOCUMENTS

| | | | |
|---|---|---|---|
| 10,607,331 B1* | 3/2020 | Tandia | G06V 10/764 |
| 10,713,794 B1* | 7/2020 | He | G06N 3/084 |
| 11,398,034 B2* | 7/2022 | Wang | G06V 10/26 |
| 11,455,732 B2* | 9/2022 | Zankowski | G06T 7/11 |
| 2017/0262735 A1 | 9/2017 | Ros Sanchez et al. | |
| 2019/0026553 A1* | 1/2019 | Deshpande | G06N 20/00 |
| 2019/0080456 A1* | 3/2019 | Song | G06T 7/174 |
| 2019/0156202 A1* | 5/2019 | Falk | G06N 3/045 |
| 2019/0236782 A1* | 8/2019 | Amit | G06T 7/0016 |
| 2019/0279074 A1* | 9/2019 | Lin | G06F 16/583 |
| 2019/0286930 A1* | 9/2019 | Han | G06N 3/08 |
| 2019/0304092 A1* | 10/2019 | Akselrod-Ballin | G06N 3/084 |
| 2019/0333222 A1* | 10/2019 | Gatti | G06T 7/143 |
| 2019/0347467 A1* | 11/2019 | Ohsaka | G06V 10/449 |
| 2019/0392242 A1* | 12/2019 | Tariq | G06V 20/58 |
| 2020/0051238 A1* | 2/2020 | El Harouni | G06T 7/0012 |
| 2020/0065968 A1* | 2/2020 | Sargent | G06V 10/82 |
| 2020/0065976 A1* | 2/2020 | Han | G06V 10/82 |
| 2020/0066407 A1* | 2/2020 | Stumpe | G06N 3/045 |
| 2020/0090316 A1* | 3/2020 | Man | G06V 10/7557 |
| 2020/0104996 A1* | 4/2020 | Akahori | G16H 50/20 |
| 2020/0151489 A1* | 5/2020 | Sriram | G06V 40/10 |
| 2020/0151511 A1* | 5/2020 | Tsutsumi | G06F 18/2155 |
| 2020/0167913 A1* | 5/2020 | Singer | G06V 20/695 |
| 2020/0193228 A1* | 6/2020 | Lu | G06N 3/045 |
| 2020/0193281 A1* | 6/2020 | Wilfred | G06K 17/0022 |
| 2020/0272902 A1* | 8/2020 | Feng | G06V 10/82 |
| 2020/0302029 A1* | 9/2020 | Holm | G06F 18/241 |
| 2020/0302189 A1* | 9/2020 | Shu | G06V 10/82 |
| 2020/0342597 A1* | 10/2020 | Chukka | G06V 20/698 |
| 2020/0357516 A1* | 11/2020 | Kirby | G16H 40/60 |
| 2020/0364863 A1* | 11/2020 | Wang | G06T 7/0012 |
| 2020/0394825 A1* | 12/2020 | Stumpe | G06V 20/69 |
| 2020/0410672 A1* | 12/2020 | Katscher | G06T 7/0012 |
| 2021/0034919 A1* | 2/2021 | Wu | G06V 30/274 |
| 2021/0042579 A1* | 2/2021 | Chen | G06N 3/08 |
| 2021/0082136 A1* | 3/2021 | Nikitidis | G06V 40/172 |
| 2021/0133963 A1* | 5/2021 | Takahashi | G06T 7/62 |
| 2021/0142095 A1* | 5/2021 | Shi | G06N 3/045 |
| 2021/0142908 A1* | 5/2021 | Lahrmann | G06V 10/82 |
| 2021/0256258 A1* | 8/2021 | Yeo | G06N 3/08 |
| 2021/0287042 A1* | 9/2021 | Wakui | G06T 7/11 |
| 2021/0287052 A1* | 9/2021 | Wakui | G06V 10/774 |
| 2021/0304006 A1* | 9/2021 | Wakui | G06N 3/045 |
| 2021/0327431 A1* | 10/2021 | Stewart | G06V 40/45 |
| 2021/0374478 A1* | 12/2021 | Lin | G06F 18/214 |
| 2021/0390673 A1* | 12/2021 | Ban | G06V 10/454 |
| 2022/0004808 A1* | 1/2022 | Yuan | G06V 10/26 |
| 2022/0189149 A1* | 6/2022 | Shiraishi | G06V 10/764 |
| 2022/0199256 A1* | 6/2022 | Yamada | G06N 20/20 |
| 2023/0252662 A1* | 8/2023 | Nikitidis | G06V 40/16 382/103 |
| 2023/0289862 A1* | 9/2023 | Yoo | G06Q 30/0629 705/26.7 |

OTHER PUBLICATIONS

Extended European Search Report for corresponding European Application No. 19895917.3, dated Jan. 5, 2022.
Ren et al., "Learning to Reweight Examples for Robust Deep Learning," Proceedings of the 35th International Conference on Machine Learning, PMLR 80, 2018, (13 pages total).
Shimizu et al., "Balanced Mini-batch Training for Imbalanced Image Data Classification with Neural Network," 2018 First International Conference on Artificial Intelligence for Industries, IEEE, 2018, pp. 27-30.
Aizawa et al., "Parts Segmentation Using Encoder-Decoder CNN Incorporating Multi-resolution," 23rd Symposium on Sensing via Image Information, Jun. 7, 2017, 18 pages.
Aizawa, "Improvement and Application of Encoder-Decoder CNN to Aircraft Image Segmentation," Institute of Image Information and Television Engineers, vol. 40, No. 28, Aug. 24, 2016, pp. 9-10 (4 pages).
Hiramatsu et al., "Cell Image Segmentation by Integration of Multiple CNNs," 24th Symposium on Sensing via Image Information, Jun. 13, 2018, 19 pages.
International Preliminary Report on Patentability and Written Opinion of the International Searching Authority (PCT/IB/326, PCT/IB/373, and PCT/ISA/237) for International Application No. PCT/JP2019/042935, dated Jun. 24, 2021, with English translation of the Written Opinion.
International Search Report (Form PCT/ISA/210) for International Application No. PCT/JP2019/042935, dated Dec. 10, 2019, with English translation.
European Communication pursuant to Article 94(3) EPC for corresponding European Application No. 19895917.3, dated Oct. 5, 2023.

* cited by examiner

MINI-BATCH LEARNING APPARATUS, OPERATION PROGRAM OF MINI-BATCH LEARNING APPARATUS, OPERATION METHOD OF MINI-BATCH LEARNING APPARATUS, AND IMAGE PROCESSING APPARATUS

CROSS-REFERENCE TO RELATED APPLICATIONS

This application is a Continuation of PCT International Application No. PCT/JP2019/042935 filed on Oct. 31, 2019, which claims priority under 35 U.S.C § 119(a) to Japanese Patent Application No. 2018-234881 filed on Dec. 14, 2018. Each of the above application(s) is hereby expressly incorporated by reference, in its entirety, into the present application.

BACKGROUND OF THE INVENTION

1. Field of the Invention

The technique of the present disclosure relates to a mini-batch learning apparatus, an operation program of the mini-batch learning apparatus, and an operation method of the mini-batch learning apparatus.

2. Description of the Related Art

There is known semantic segmentation which determines a plurality of classes in an image in units of pixels. The semantic segmentation is realized by a machine learning model (hereinafter, simply referred to as a model) such as a U-shaped convolutional neural network (U-Net, U-shaped neural network).

In order to improve a determination accuracy of the model, it is necessary to update the model by inputting learning data to the model and learning the learning data. The learning data includes a learning input image and an annotation image in which a class in the learning input image is manually designated. In JP2017-107386A, from a plurality of learning input images, one learning input image which is a source of the annotation image is extracted.

SUMMARY OF THE INVENTION

For learning, there is a method called mini-batch learning. In mini-batch learning, as learning data, mini-batch data is input to the model. The mini-batch data includes some divided images (100 divided images) among a plurality of divided images obtained by dividing the learning input image and the annotation image (for example, 10000 divided images obtained by dividing an original image by a frame having a size of $\frac{1}{100}$ of the size of the original image). A plurality of sets (for example, 100 sets) of the mini-batch data are generated, and each set is sequentially input to the model.

Here, a case where there is a class bias in the learning input image and the annotation image is considered. For example, the learning input image is a phase-contrast-microscope image in which a state of cell culture appears. In the learning input image, differentiated cells are classified as a class 1, undifferentiated cells are classified as a class 2, a medium is classified as a class 3, and dead cells are classified as a class 4. In area ratios of classes in the entire learning input image and the entire annotation image, an area ratio of the differentiated cells is 38%, an area ratio of the undifferentiated cells is 2%, an area ratio of the medium is 40%, and an area ratio of the dead cells is 20%, and the area ratio of the undifferentiated cells is relatively low.

In a case where there is a class bias in the learning input image and the annotation image in this way, it is likely that there is also a class bias in the mini-batch data including the learning input image and the annotation image. In a case where there is a class bias in the mini-batch data, learning is performed without taking into account a rare class of which the area ratio is relatively low. As a result, a model with a low rare class determination accuracy is obtained.

In JP2017-107386A, as described above, from the plurality of learning input images, one learning input image which is a source of the annotation image is extracted. However, in this method, in a case where there is a class bias in all of the plurality of learning input images, a model with a low rare class determination accuracy is obtained in the end. As a result, the method described in JP2017-107386A cannot solve the problem that a model with a low rare class determination accuracy is obtained.

An object of the technique of the present disclosure is to provide a mini-batch learning apparatus capable of preventing a decrease in a class determination accuracy of a machine learning model for performing semantic segmentation, an operation program of the mini-batch learning apparatus, an operation method of the mini-batch learning apparatus, and an image processing apparatus in which the mini-batch learning apparatus is implemented.

In order to achieve the object, according to the present disclosure, there is provided a mini-batch learning apparatus that learns a machine learning model for performing semantic segmentation, which determines a plurality of classes in an image in units of pixels, by inputting mini-batch data to the machine learning model, the apparatus including: a calculation unit that calculates an area ratio of each of the plurality of classes in the mini-batch data; a specifying unit that specifies a rare class of which the area ratio is lower than a setting value; and an update unit that updates the machine learning model according to a result of the learning using the mini-batch data and sets an update level of the machine learning model in a case where the rare class is specified by the specifying unit to be lower than an update level of the machine learning model in a case where the rare class is not specified by the specifying unit.

Preferably, the update unit sets a learning coefficient indicating a change range in various parameter values of the machine learning model in a case where the rare class is specified by the specifying unit to be smaller than a learning coefficient in a case where the rare class is not specified by the specifying unit.

Preferably, the mini-batch learning apparatus further includes a reception unit that receives a selection instruction as to whether or not to cause the update unit to perform processing of setting the update level to be low.

According to the present disclosure, there is provided an operation program of a mini-batch learning apparatus that learns a machine learning model for performing semantic segmentation, which determines a plurality of classes in an image in units of pixels, by inputting mini-batch data to the machine learning model, the program causing a computer to function as: a calculation unit that calculates an area ratio of each of the plurality of classes in the mini-batch data a specifying unit that specifies a rare class of which the area ratio is lower than a setting value; and an update unit that updates the machine learning model according to a result of the learning using the mini-batch data and sets an update level of the machine learning model in a case where the rare class is specified by the specifying unit to be lower than an update level of the machine learning model in a case where the rare class is not specified by the specifying unit.

According to the present disclosure, there is provided an operation method of a mini-batch learning apparatus that learns a machine learning model for performing semantic segmentation, which determines a plurality of classes in an image in units of pixels, by inputting mini-batch data to the machine learning model, the method including: a calculation step of calculating an area ratio of each of the plurality of classes in the mini-batch data; a specifying step of specifying a rare class of which the area ratio is lower than a setting value; and an update step of updating the machine learning model according to a result of the learning using the mini-batch data and setting an update level of the machine learning model in a case where the rare class is specified in the specifying step to be lower than an update level of the machine learning model in a case where the rare class is not specified in the specifying step.

According to the technique of the present disclosure, it is possible to provide a mini-batch learning apparatus capable of preventing a decrease in a class determination accuracy of a machine learning model for performing semantic segmentation, an operation program of the mini-batch learning apparatus, an operation method of the mini-batch learning apparatus, and an image processing apparatus.

DESCRIPTION OF THE PREFERRED EMBODIMENTS

First Embodiment

Figure 1:
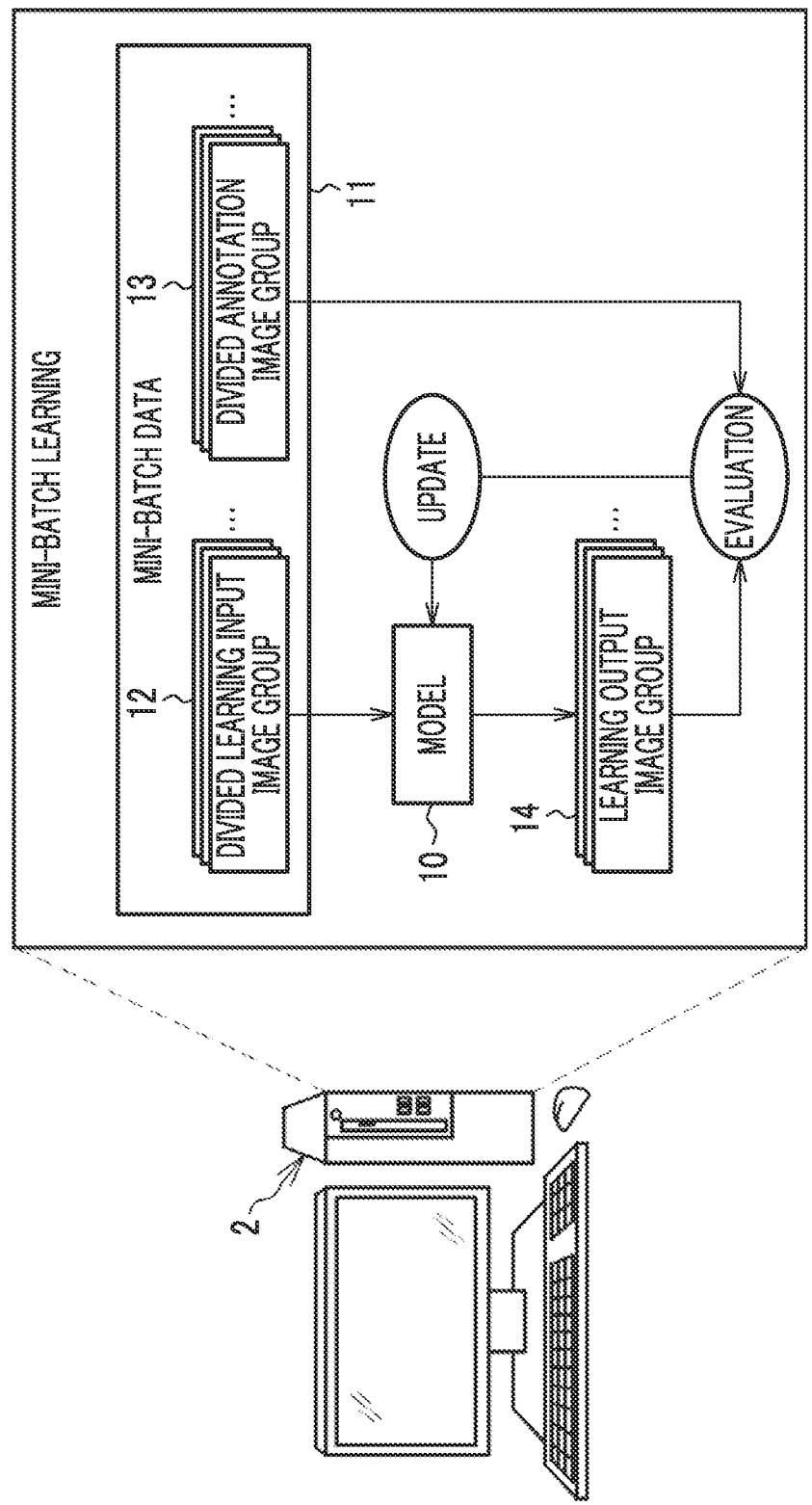
FIG. 1 is a diagram illustrating a mini-batch learning apparatus and an outline of processing of the mini-batch learning apparatus.

In FIG. 1, in order to improve a determination accuracy of a model 10 for performing semantic segmentation, which determines a plurality of classes in an input image in units of pixels, a mini-batch learning apparatus 2 performs mini-batch learning by inputting mini-batch data 11 to the model 10. The mini-batch learning apparatus 2 is, for example, a desktop personal computer. Further, the model 10 is, for example, U-Net.

The class may be referred to as a type of an object that appears in the input image. Further, in short, the semantic segmentation is a technique of determining a class and a contour of an object appearing in an input image, and the model 10 outputs a determination result as an output image. For example, in a case where three objects of a cup, a book, and a mobile phone appear in an input image, in an output image, ideally, each of the cup, the book, and the mobile phone is determined as a class, and contour lines that faithfully trace contours of these objects are drawn on each object.

By inputting the learning data to the model 10, learning the learning data, and updating the model 10, the class determination accuracy of the model 10 is improved. The learning data includes a pair of a learning input image which is to be input to the model 10 and an annotation image in which a class in the learning input image is manually designated. The annotation image is a correct answer image for matching an answer with a learning output image, which is output from the model 10 in accordance with the learning input image, and is compared with the learning output image. As the class determination accuracy of the model 10 is higher, a difference between the annotation image and the learning output image is smaller.

As described above, the mini-batch learning apparatus 2 uses mini-batch data 11 as the learning data. The mini-batch data 11 includes a divided learning input image group 12 and a divided annotation image group 13.

In mini-batch learning, the divided learning input image group 12 is input to the model 10. Thereby, a learning output image is output from the model 10 for each divided learning input image 20S (refer to FIG. 4) of the divided learning input image group 12. The learning output image group 14, which is a set of learning output images output from the model 10 in this way, is compared with the divided annotation image group 13, and thus a class determination accuracy of the model 10 is evaluated. The model 10 is updated according to an evaluation result of the class determination accuracy. The mini-batch learning apparatus 2 inputs the divided learning input image group 12 to the model 10, outputs the learning output image group 14 from the model 10, evaluates the class determination accuracy of the model 10, and updates the model 10 while changing the mini-batch data 11. The processing is repeated until the class determination accuracy of the model 10 reaches a desired level.

Figure 2:
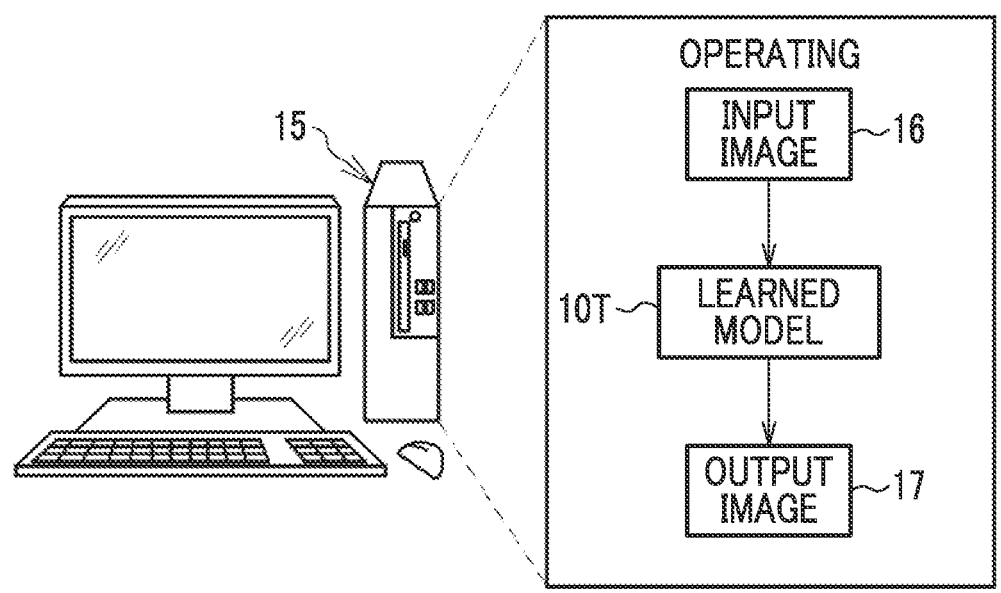
FIG. 2 is a diagram illustrating an operating apparatus and an outline of processing of the operating apparatus.

As illustrated in FIG. 2, the model 10 in which the class determination accuracy is raised to a desired level as described above is incorporated into an operating apparatus 15, as a learned machine learning model 10T (hereinafter, referred to as a learned model). An input image 16 in which a class and a contour of an appeared object are not yet determined is input to the learned model 10T. The learned model 10T determines a class and a contour of an object appeared in the input image 16, and outputs an output image 17 as a determination result. Similar to the mini-batch learning apparatus 2, the operating apparatus 15 is, for example, a desktop personal computer, and displays an input image 16 and an output image 17 side by side on a display. The operating apparatus 15 may be an apparatus different from the mini-batch learning apparatus 2 or the same apparatus as the mini-batch learning apparatus 2. Further, even after the learned model 10T is incorporated into the operating apparatus 15, the learned model 10T may be learned by inputting the mini-batch data 11 to the learned model 10T.

Figure 3:
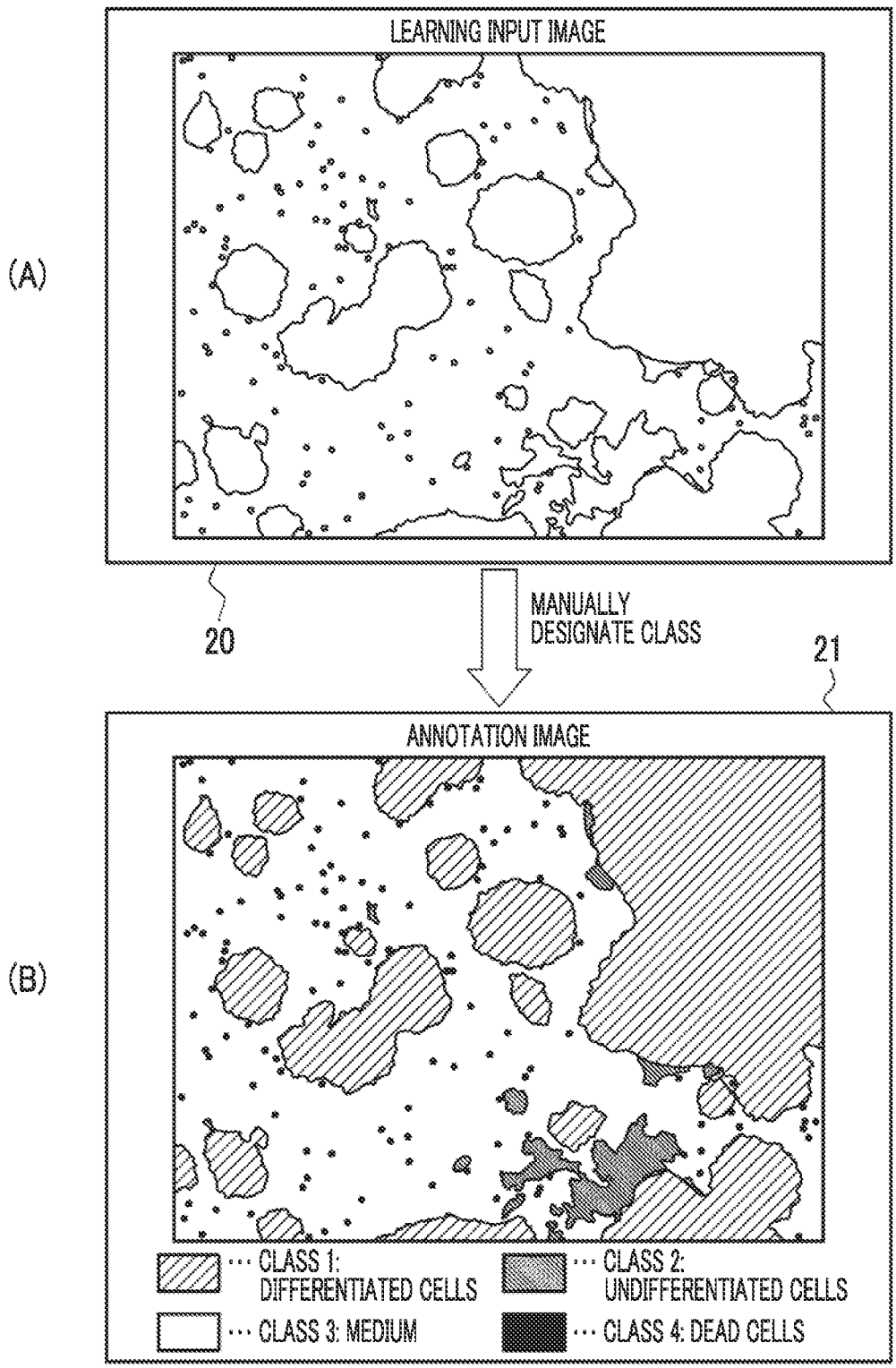
FIG. 3 is a diagram illustrating images, (a) of FIG. 3 illustrates a learning input image, and (b) of FIG. 3 illustrates an annotation image.

As illustrated in (a) of FIG. 3, the learning input image 20 is, in this example, one phase-contrast-microscope image in which a state of cell culture appears. In the learning input image 20, differentiated cells, undifferentiated cells, a medium, and dead cells appear as objects. In this case, as illustrated in (b) of FIG. 3, in an annotation image 21, class-1 differentiated cells, class-2 undifferentiated cells, a class-3 medium, and class-4 dead cells are respectively and manually designated. The input image 16 which is input to the learned model 10T is also a phase-contrast-microscope image in which a state of cell culture appears, similar to the learning input image 20.

Figure 4:
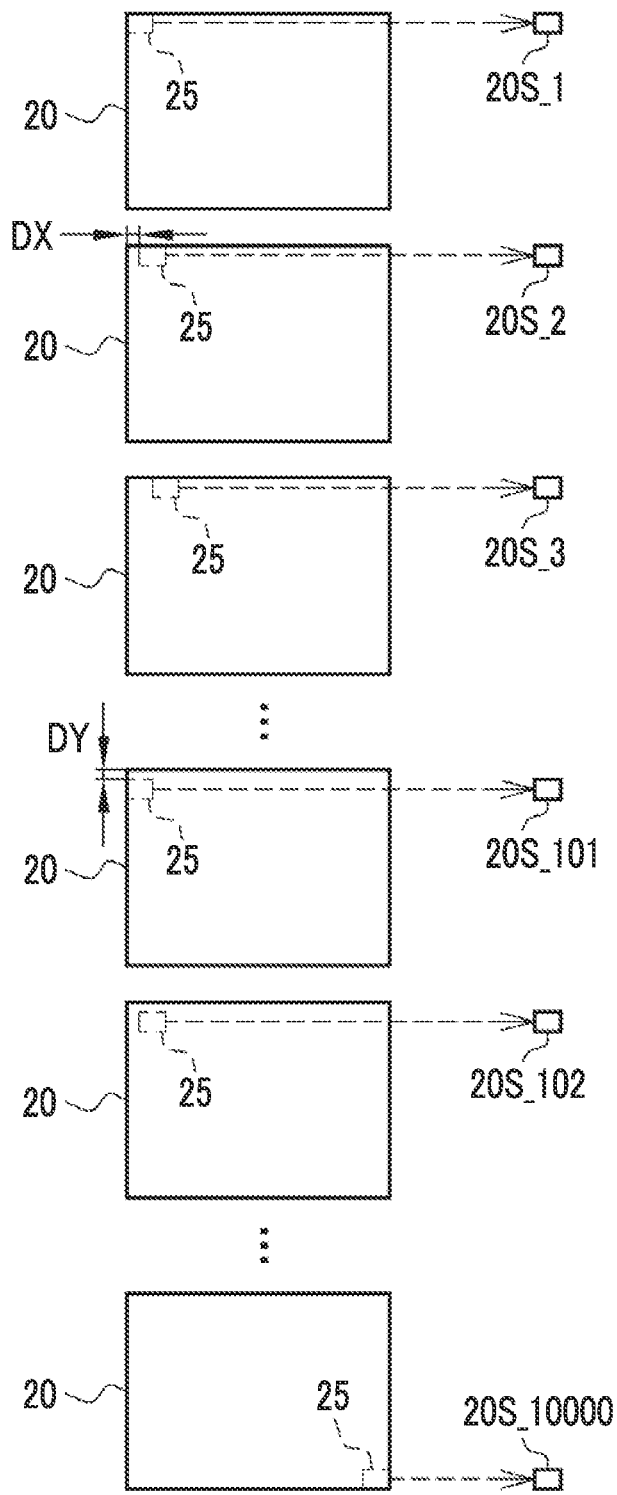
FIG. 4 is a diagram illustrating how a divided learning input image is generated from a learning input image.

As illustrated in FIG. 4, the divided learning input image 20S is obtained by cutting out a region surrounded by a rectangular frame 25, which is sequentially moved by DX in a horizontal direction and by DY in a vertical direction in the learning input image 20, each time. The movement amount DX of the frame 25 in the horizontal direction is, for example, ½ of a size of the frame 25 in the horizontal direction. Similarly, the movement amount DY of the frame 25 in the vertical direction is, for example, ½ of a size of the frame 25 in the vertical direction. A size of the frame 25 is, for example, 1/50 of the size of the learning input image 20. In this case, the divided learning input images 20S include a total of 10000 divided learning input images 20S_1 to 20S_10000.

Figure 5:
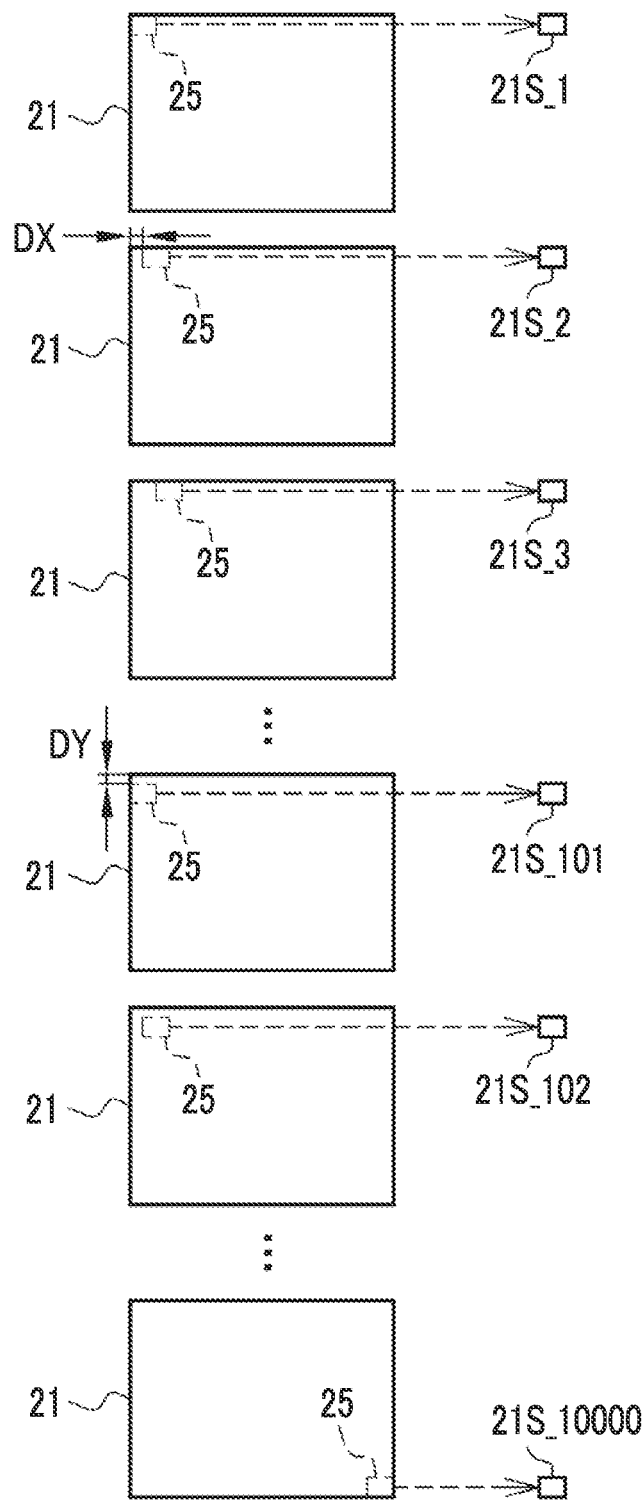
FIG. 5 is a diagram illustrating how a divided annotation image is generated from an annotation image.

Similarly, as illustrated in FIG. 5, the divided annotation image 21S is obtained by cutting out a region surrounded by a rectangular frame 25, which is sequentially moved by DX in the horizontal direction and by DY in the vertical direction in the annotation image 21, each time. In this case, the divided annotation images 21S include a total of 10000 divided annotation images 21S_1 to 21S_10000. In the following, it is assumed that the learning input image 20 and the annotation image 21 are already prepared in the mini-batch learning apparatus 2, and that the divided learning input images 20S and the divided annotation images 21S are already generated.

Figure 6:
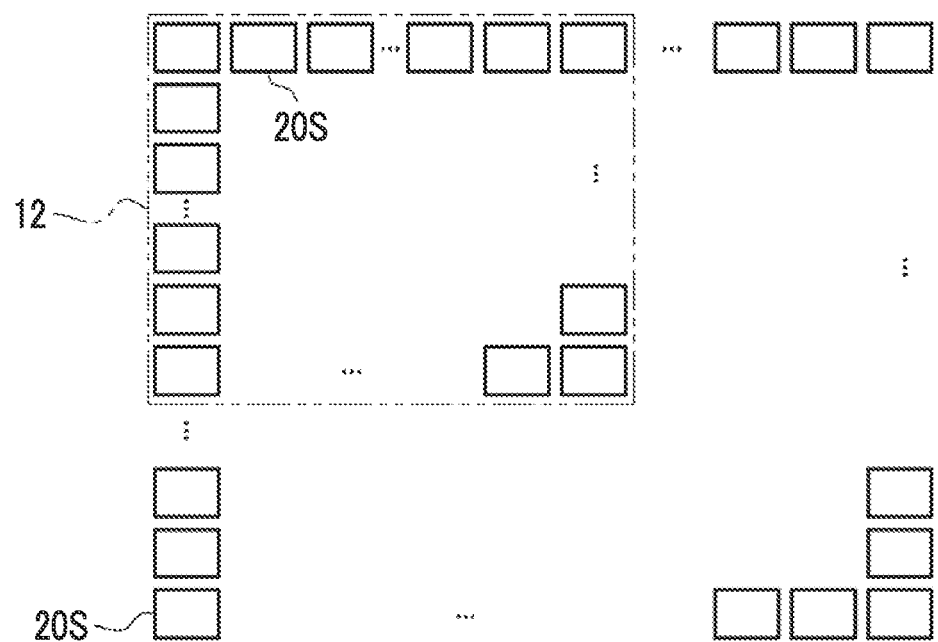
FIG. 6 is a diagram illustrating that a divided learning input image group includes some of a plurality of divided learning input images.
Figure 7:
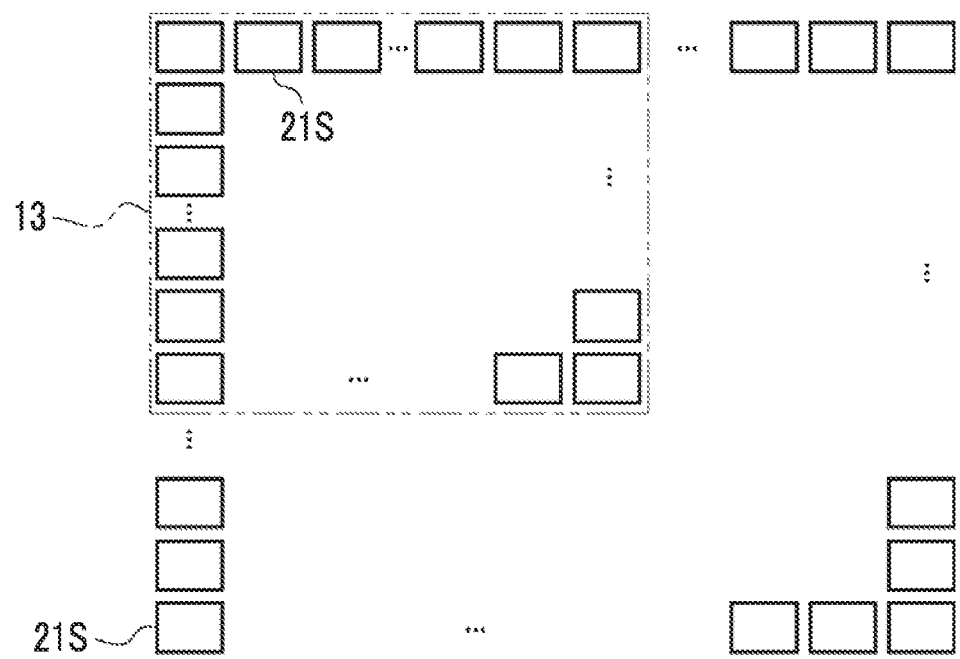
FIG. 7 is a diagram illustrating that a divided annotation image group includes some of a plurality of divided annotation images.

As illustrated in FIG. 6, the divided learning input image group 12 includes some divided learning input images 20S among the plurality of divided learning input images 20S generated as illustrated in FIG. 4 (for example, 100 divided learning input images 20S among 10000 divided learning input images 20S). Similarly, as illustrated in FIG. 7, the divided annotation image group 13 includes some divided annotation images 21S among the plurality of divided annotation images 21S generated as illustrated in FIG. 5 (for example, 100 divided annotation images 21S among 10000 divided annotation images 21S). The divided learning input image 20S included in the divided learning input image group 12 and the divided annotation image 21S included in the divided annotation image group 13 have the same region which is cut out by the frame 25.

Figure 8:
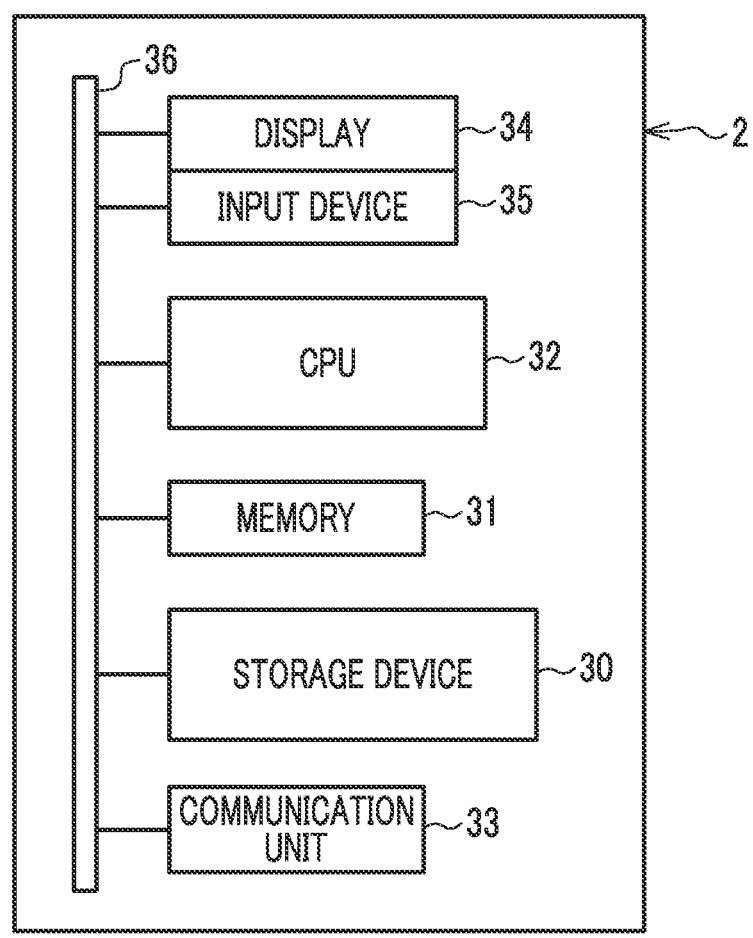
FIG. 8 is a block diagram illustrating a computer including the mini-batch learning apparatus.

In FIG. 8, a computer including the mini-batch learning apparatus 2 includes a storage device 30, a memory 31, a central processing unit (CPU) 32, a communication unit 33, a display 34, and an input device 35. The components are connected to each other via a data bus 36.

The storage device 30 is a hard disk drive that is built in the computer including the mini-batch learning apparatus 2 or is connected via a cable or a network. Alternatively, the storage device 30 is a disk array in which a plurality of hard disk drives are connected in series. The storage device 30 stores a control program such as an operating system, various application programs, and various data associated with the programs.

The memory 31 is a work memory which is necessary to execute processing by the CPU 32. The CPU 32 loads the program stored in the storage device 30 into the memory 31, and collectively controls each unit of the computer by executing processing according to the program.

The communication unit 33 is a network interface that controls transmission of various information via a network such as a wide area network (WAN), for example, the Internet or a public communication network. The display 34 displays various screens. The various screens include operation functions by a graphical user interface (GUI). The computer including the mini-batch learning apparatus 2 receives an input of an operation instruction from the input device 35 via the various screens. The input device 35 includes a keyboard, a mouse, a touch panel, and the like.

Figure 9:
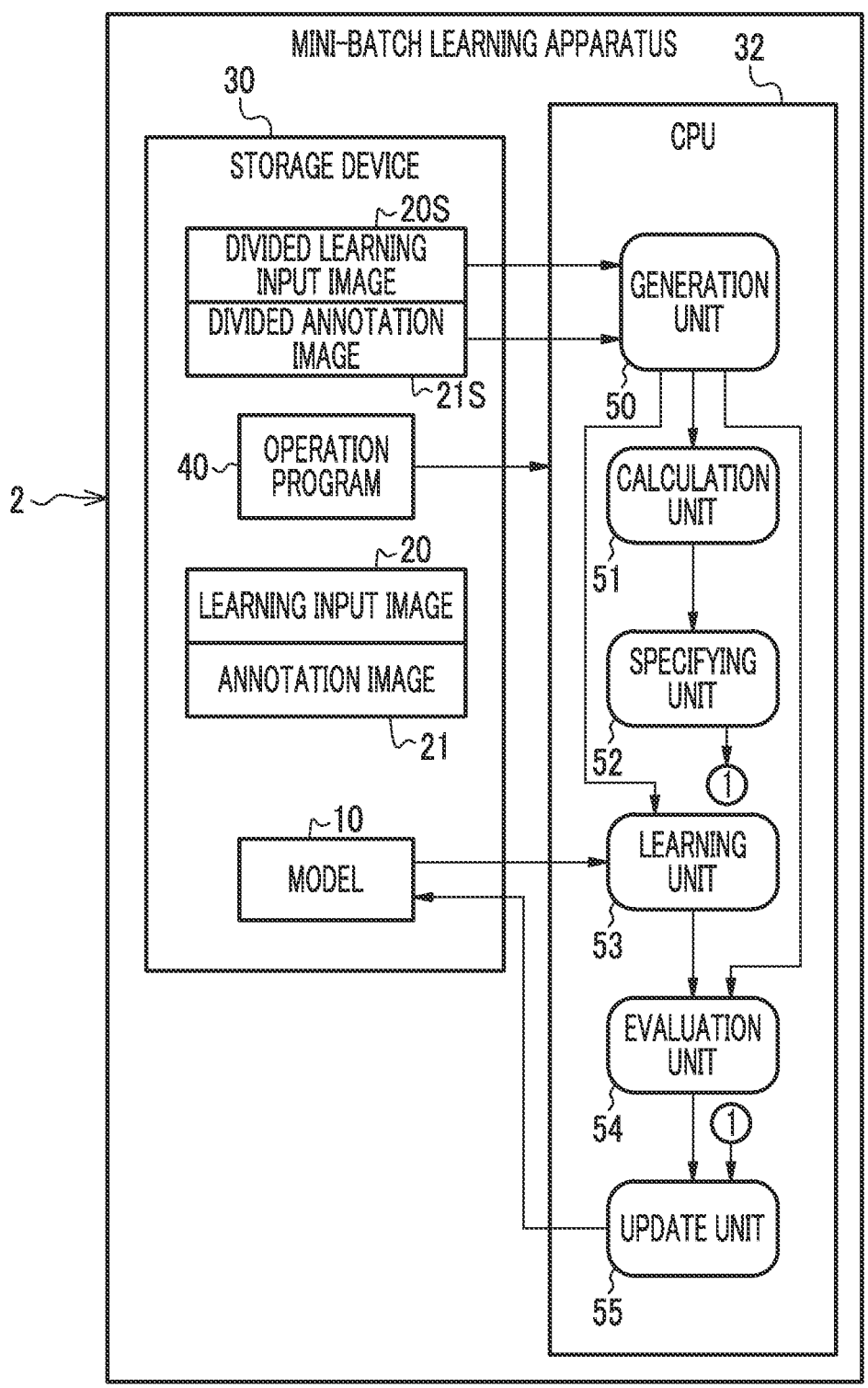
FIG. 9 is a block diagram illustrating a processing unit of a CPU of the mini-batch learning apparatus.

In FIG. 9, the storage device 30 stores the learning input image 20, the annotation image 21, the divided learning input images 20S, the divided annotation images 21S, and the model 10. Further, the storage device 30 stores an operation program 40 as an application program. The operation program 40 is an application program for operating the computer as the mini-batch learning apparatus 2.

In a case where the operation program 40 is started, the CPU 32 of the computer including the mini-batch learning apparatus 2 functions as a generation unit 50, a calculation unit 51, a specifying unit 52, a learning unit 53, an evaluation unit 54, and an update unit 55, in cooperation with the memory 31.

The generation unit 50 generates the mini-batch data 11 by selecting, as illustrated in FIGS. 6 and 7, some images from the divided learning input images 20S and the divided annotation images 21S generated from the learning input image 20 and the annotation image 21 illustrated in FIGS. 4 and 5. The generation unit 50 generates a plurality of sets (for example, 100 sets) of the mini-batch data 11. The generation unit 50 outputs the generated mini-batch data 11 to the calculation unit 51, the learning unit 53, and the evaluation unit 54.

The generation unit 50 may execute a method of increasing selection alternatives of the divided learning input images 20S and the divided annotation images 21S as the mini-batch data 11. Specifically, the generation unit 50 obtains additional images by performing image processing such as trimming, vertical inversion, or rotation on the divided learning input images 20S and the divided annotation images 21S, and sets the obtained images as new selection alternatives for the mini-batch data 11. The method is called data augmentation.

The calculation unit 51 calculates an area ratio of each of the plurality of classes in the mini-batch data 11. More specifically, the calculation unit 51 adds, for each class, the number of pixels of regions, which are manually designated in the divided annotation images 21S of the divided annotation image group 13 of the mini-batch data 11 generated from the generation unit 50. Next, the calculation unit 51 calculates an area ratio by dividing the added number of pixels by the total number of pixels of the divided annotation images 21S. For example, in a case where the added number of pixels of the regions designated as the class-1 differentiated cells is 10000 and the total number of pixels is 50000, the area ratio of the class-1 differentiated cells is (10000/50000)×100=20%. The calculation unit 51 outputs the calculated area ratio to the specifying unit 52.

The specifying unit 52 specifies a rare class of which the area ratio is lower than the setting value. The specifying unit 52 outputs the specified rare class to the update unit 55.

The learning unit 53 learns the model 10 by inputting, to the model 10, the divided learning input image group 12 of the mini-batch data 11 generated from the generation unit 50. Thereby, the learning unit 53 outputs, to the evaluation unit 54, the learning output image group 14 which is output from the model 10.

The evaluation unit 54 evaluates the class determination accuracy of the model 10 by comparing the divided annotation image group 13 of the mini-batch data 11 generated from the generation unit 50 with the learning output image group 14 output from the learning unit 53. The evaluation unit 54 outputs an evaluation result to the update unit 55.

The evaluation unit 54 evaluates the class determination accuracy of the model 10 by using a loss function. The loss function is a function representing a degree of a difference between the divided annotation image group 13 and the learning output image group 14. As a value calculated by the loss function is closer to 0, the class determination accuracy of the model 10 is higher.

The update unit 55 updates the model 10 according to the evaluation result from the evaluation unit 54. More specifically, the update unit 55 changes various parameter values of the model 10, by a stochastic gradient descent method or the like using a learning coefficient η (refer to FIG. 11). The learning coefficient η indicates a change range in various parameter values of the model 10. That is, as the learning coefficient η has a relatively large value, the change range in various parameter values becomes wider, and thus, an update level of the model 10 becomes higher.

The update unit 55 sets the update level of the model 10 in a case where a rare class is specified by the specifying unit 52 to be lower than the update level of the model 10 in a case where a rare class is not specified by the specifying unit 52. More specifically, the update unit 55 sets the learning coefficient ηB in a case where a rare class is specified by the specifying unit 52 to be smaller than the learning coefficient ηA in a case where a rare class is not specified by the specifying unit 52 (ηB<ηA). For example, the learning coefficient ηB is set to 1/10 of the learning coefficient ηA.

Figure 10:
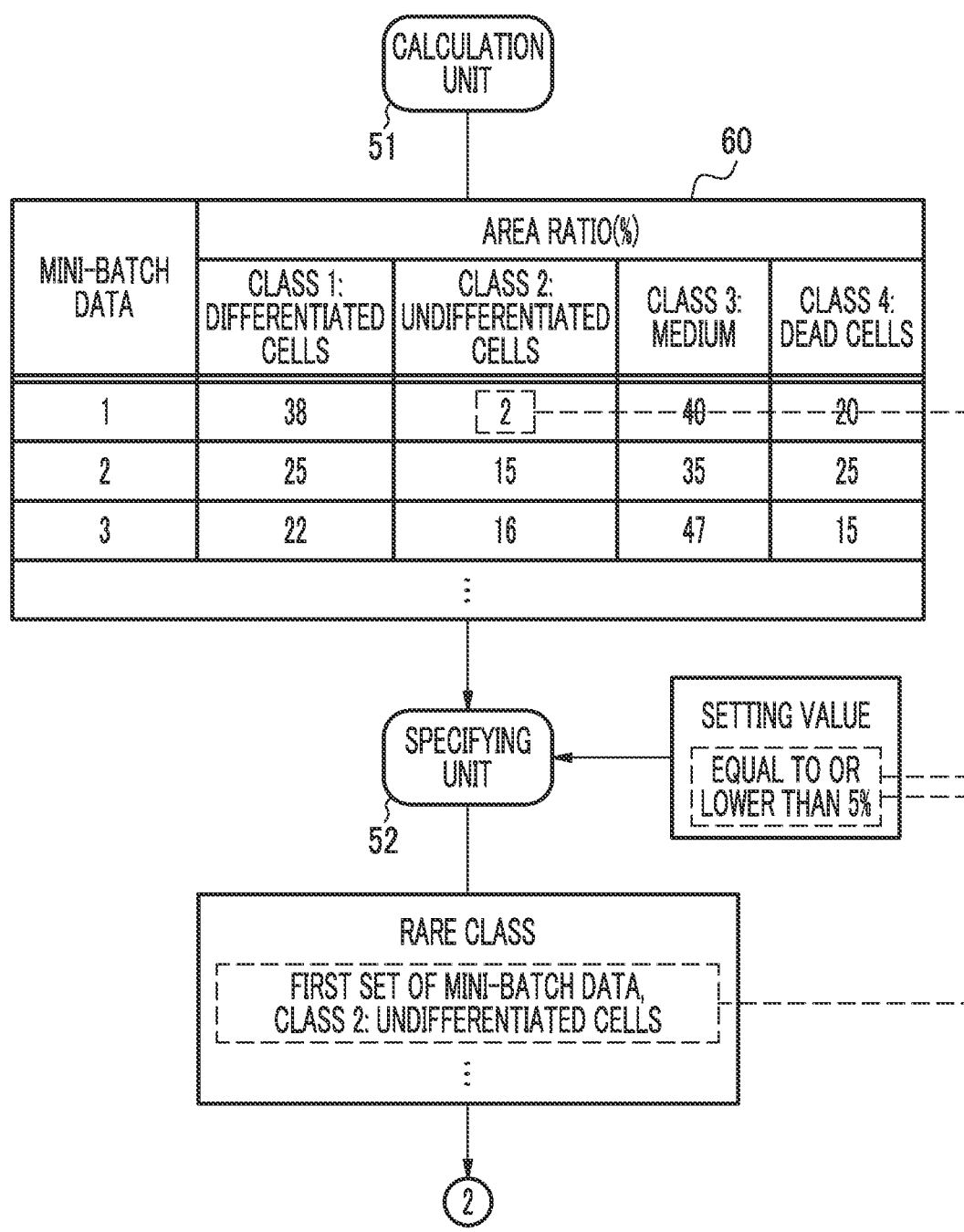
FIG. 10 is a diagram illustrating a specific example of processing of a calculation unit and a specifying unit.
Figure 11:
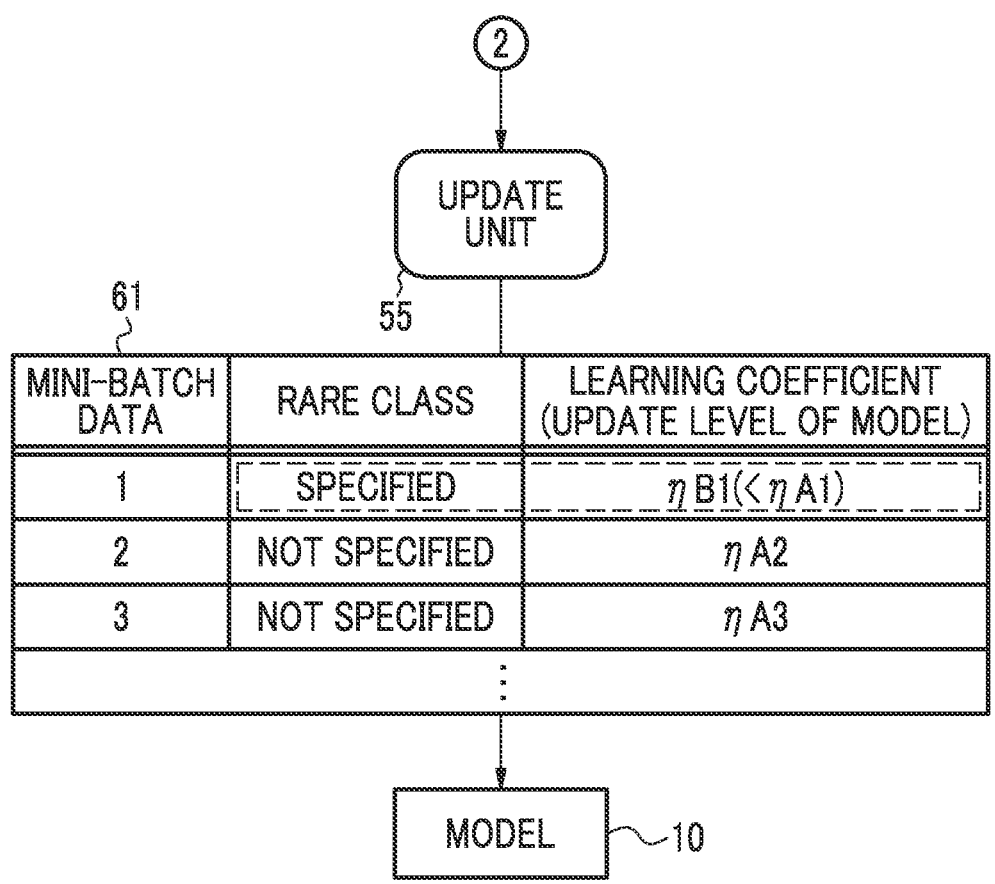
FIG. 11 is a diagram illustrating a specific example of processing of an update unit.

FIGS. 10 and 11 illustrate specific examples of processing of each unit of the calculation unit 51, the specifying unit 52, and the update unit 55. First, in FIG. 10, as shown in a table 60, the calculation unit 51 calculates the area ratio of each class for each set 1, 2, 3, . . . of the mini-batch data 11. In FIG. 10, for a first set of the mini-batch data 11, a case where the area ratio of the class-1 differentiated cells is calculated as 38%, the area ratio of the class-2 undifferentiated cells is calculated as 2%, the area ratio of the class-3 medium is calculated as 40%, and the area ratio of the class-4 dead cells is calculated as 20% is exemplified.

The specifying unit 52 specifies a rare class of which the area ratio is lower than the setting value. In FIG. 10, assuming that the setting value is equal to or lower than 5%, for the first set of the mini-batch data 11, a case where the class-2 undifferentiated cells of which the area ratio is 2% lower than the setting value are specified as a rare class is exemplified. In FIG. 10, a case where only one rare class is specified is exemplified. On the other hand, in a case where there are a plurality of classes of which the area ratio is lower than the setting value, naturally, the plurality of classes are specified as rare classes.

Subsequently, in FIG. 11, as shown in a table 61, in a case of a first set of the mini-batch data 11 in which a rare class is specified, the update unit 55 sets the learning coefficient ηB1 to be smaller than the learning coefficient ηA1 in a case where a rare class is not specified. On the other hand, in a case of a second set and a third set of the mini-batch data 11 in which a rare class is not specified, the update unit 55 sets the learning coefficients ηA2 and ηA3 in a case where a rare class is not specified as the learning coefficients are. By setting the learning coefficient η to be smaller in this way, in a case of the mini-batch data 11 in which a rare class is specified, the update unit 55 sets the update level of the model 10 to be smaller than the update level of the model 10 in a case where a rare class is not specified.

Figure 12:
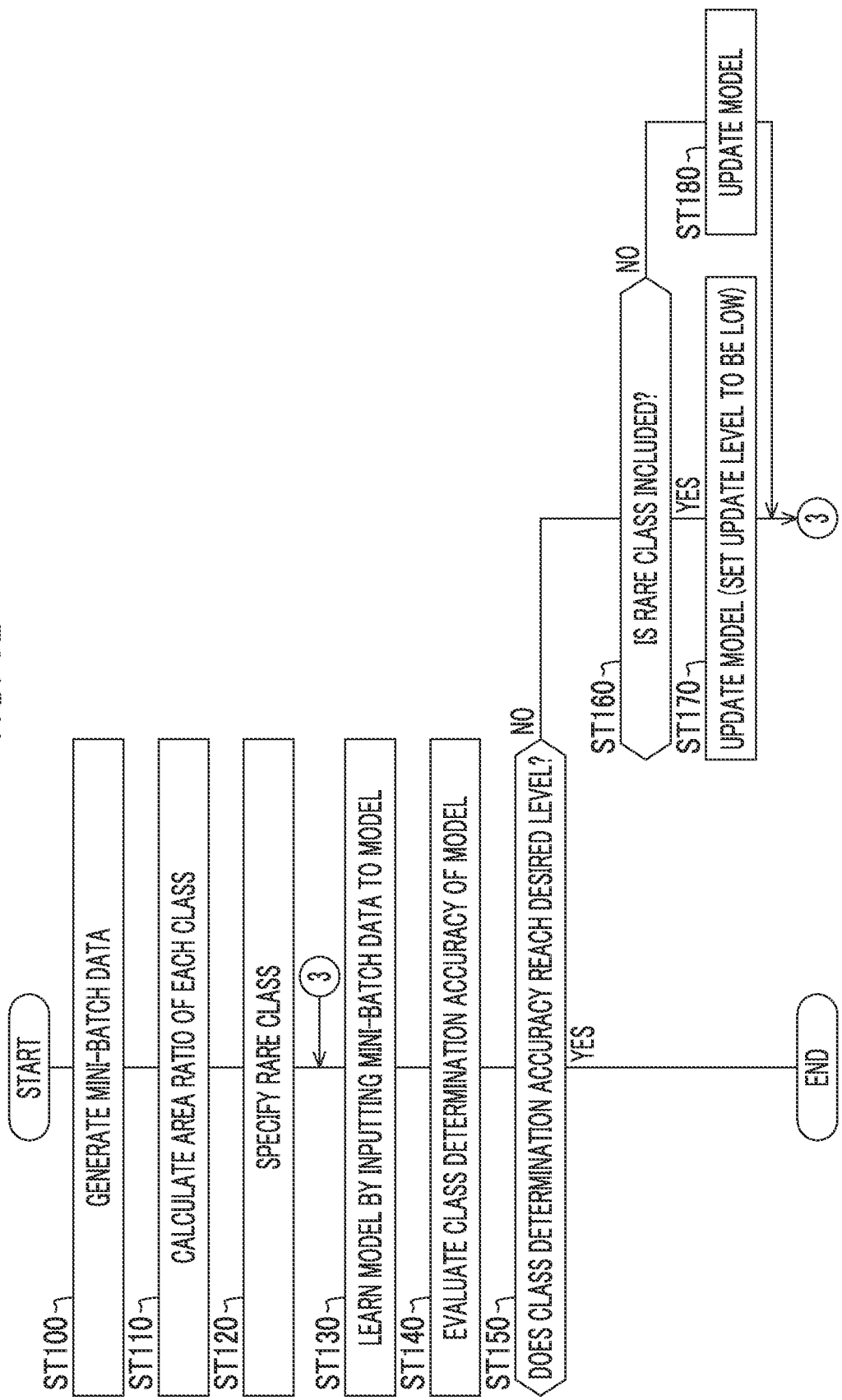
FIG. 12 is a flowchart illustrating a processing procedure of the mini-batch learning apparatus.

Next, an operation according to the configuration will be described with reference to a flowchart illustrated in FIG. 12. First, in a case where the operation program 40 is started, as illustrated in FIG. 9, the CPU 32 of the computer including the mini-batch learning apparatus 2 functions as each of the processing units 50 to 55.

The mini-batch data 11 is generated by the generation unit 50 (step ST100). The mini-batch data 11 is output from the generation unit 50 to the calculation unit 51, the learning unit 53, and the evaluation unit 54.

As shown in the table 60 of FIG. 10, the calculation unit 51 calculates the area ratio of each class for each set of the mini-batch data 11 (step ST110, calculation step). Subsequently, as illustrated in FIG. 10, a rare class of which the area ratio is lower than the setting value is specified by the specifying unit 52 (step ST120, specifying step).

The model 10 is learned by the learning unit 53 by inputting, to the model 10, the divided learning input image group 12 of the mini-batch data 11 generated from the generation unit 50 (step ST130). Thereby, the class determination accuracy of the model 10 is evaluated by the evaluation unit 54 by comparing the learning output image group 14 output from the model 10 with the divided annotation image group 13 of the mini-batch data 11 from the generation unit 50 (step ST140).

In a case where it is determined that the class determination accuracy of the model 10 reaches a desired level based on the evaluation result by the evaluation unit 54 (YES in step ST150), the mini-batch learning is ended. On the other hand, in a case where it is determined that the class determination accuracy of the model 10 does not reach a desired level (NO in step ST150), the processing proceeds to step ST160.

In a case where there is a rare class in the mini-batch data 11 which is input to the model 10 in step ST130 (YES in step ST160), as shown in a table 61 of FIG. 11, the model 10 is updated by the update unit 55 with an update level lower than an update level in a case where there is no rare class (step ST170, update step). On the other hand, in a case where there is no rare class in the mini-batch data 11 which is input to the model 10 in step ST130 (NO in step ST160), the model 10 is updated with a normal update level without setting the update level to be low (step ST180, update step). After step ST170 and step ST180, the process returns to step ST130. Another set of the mini-batch data 11 is input to the model 10, and the subsequent steps are repeated.

The case where the rare class is specified by the specifying unit 52 is a case where there is a class bias in the mini-batch data 11. In the mini-batch data 11 in which there is a class bias, learning is performed without taking into account a rare class. More specifically, a frequency of learning of the rare class is relatively lower than a frequency of learning of other classes. After biased learning is performed, in a case where the model 10 is updated by the update unit 55 without any restriction, a result of the biased learning has a great influence on the model 10. As a result, the model 10 having a low rare class determination accuracy is obtained.

On the other hand, in the present embodiment, the update unit 55 sets the update level of the model 10 in a case where a rare class is specified by the specifying unit 52 to be lower than the update level of the model 10 in a case where a rare class is not specified by the specifying unit 52. By setting the update level in this way, in a case where there is a class bias in the mini-batch data 11, the model 10 is not updated much, and a result of the learning using the mini-batch data 11 in which there is a class bias does not have a great influence on the model 10. Therefore, it is possible to avoid a situation in which the model 10 having a low rare class determination accuracy is obtained, and it is possible to prevent a decrease in the class determination accuracy of the model 10.

Figure 13:
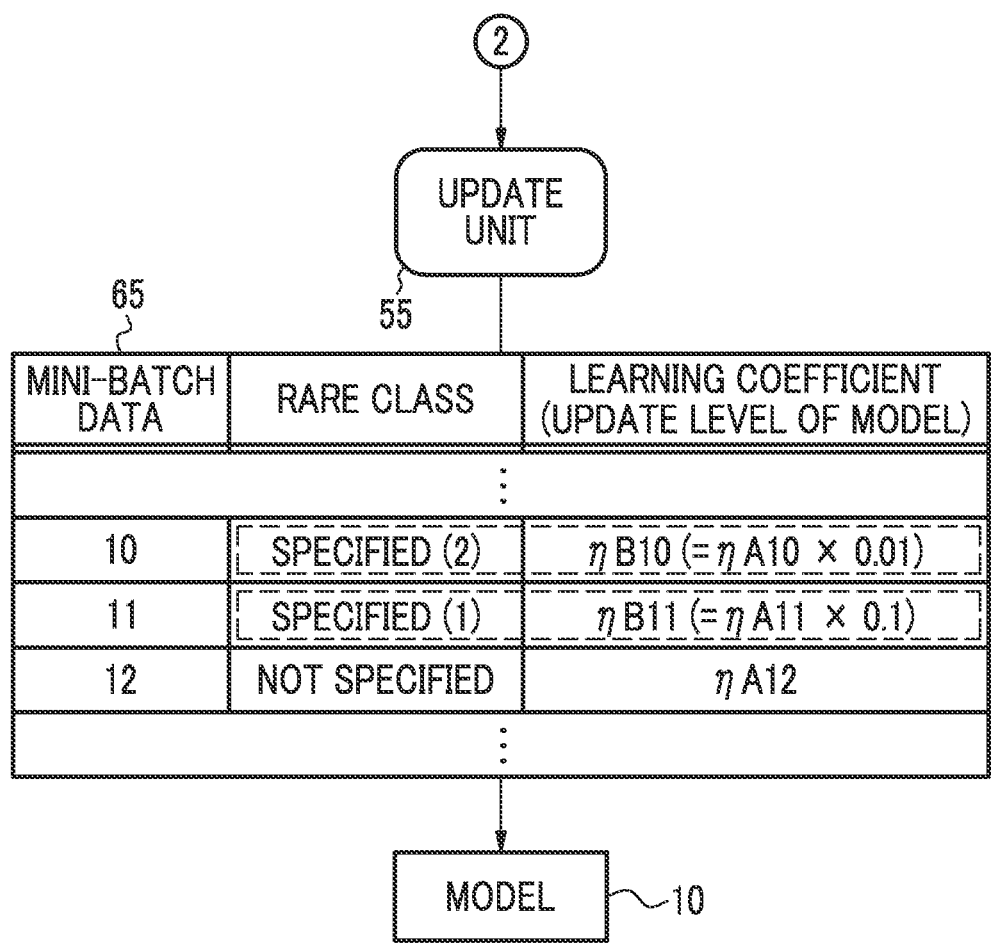
FIG. 13 is a diagram illustrating a modification example of processing of the update unit.

As the number of the specified rare classes is larger, a degree to which the update level of the model 10 is set to be low may be increased. For example, as shown in a table 65 of FIG. 13, in a case of a tenth set of the mini-batch data 11 in which two rare classes are specified, the update unit 55 sets the learning coefficient $\eta B10$ to $\frac{1}{100}$ of the learning coefficient $\eta A10$ in a case where a rare class is not specified ($\eta B10=\eta A10\times 0.01$). On the other hand, in a case of a 11th set of the mini-batch data 11 in which only one rare class is specified, the update unit 55 sets the learning coefficient $\eta B11$ to $\frac{1}{10}$ of the learning coefficient $\eta A11$ in a case where a rare class is not specified ($\eta B11=\eta A11\times 0.1$). It is considered that there is a larger class bias in the mini-batch data 11 as the number of the specified rare classes is larger. Thus, it is possible to further prevent a decrease in the class determination accuracy of the model 10.

Figure 14:
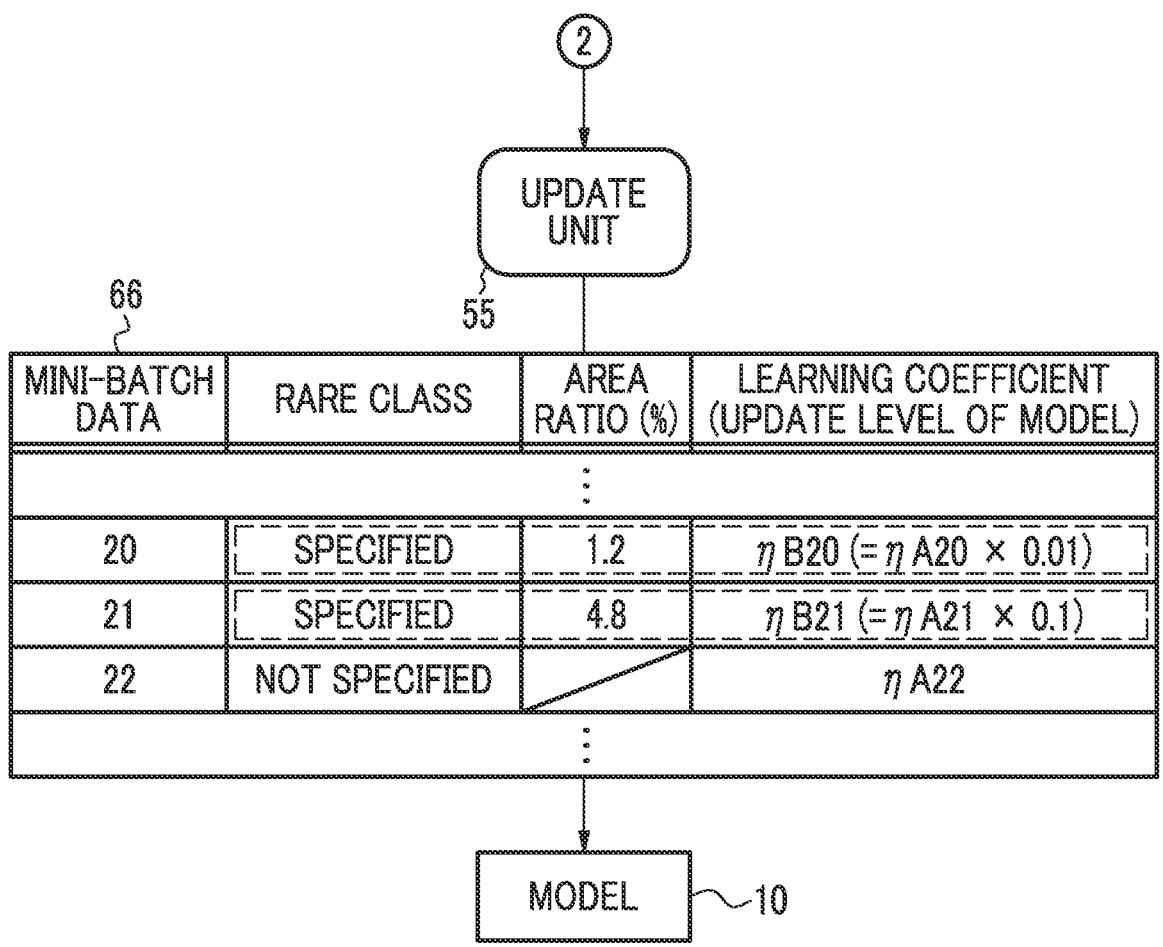
FIG. 14 is a diagram illustrating a modification example of processing of the update unit.

Similarly, as the area ratio is lower, a degree to which the update level of the model 10 is set to be low may be increased. For example, as shown in a table 66 of FIG. 14, in a case where the area ratio is equal to or higher than 0% and lower than 2.5% as in the 20th set of the mini-batch data 11, the learning coefficient $\eta B20$ is set to $\frac{1}{100}$ of the learning coefficient $\eta A20$ ($\eta B20=\eta A20\times 0.01$). On the other hand, in a case where the area ratio is equal to or higher than 2.5% and equal to or lower than 5% as in the 21st set of the mini-batch data 11, the learning coefficient $\eta B21$ is set to $\frac{1}{10}$ of the learning coefficient $\eta A21$ ($\eta B21=\eta A21\times 0.1$). Even in this case, similar to the case of FIG. 13, it is considered that there is a larger class bias in the mini-batch data 11 as the area ratio is lower. Thus, it is possible to further prevent a decrease in the class determination accuracy of the model 10.

Second Embodiment

Figure 15:
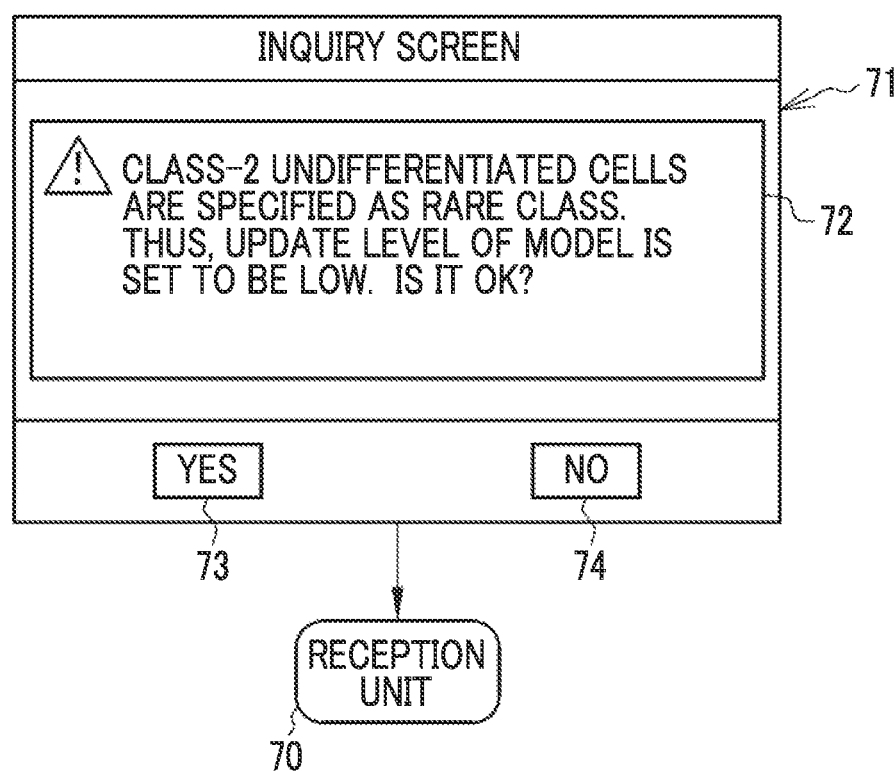
FIG. 15 is a diagram illustrating a second embodiment for inquiring whether or not to cause the update unit to perform processing of setting an update level to be low.

In a second embodiment illustrated in FIG. 15, whether or not to cause the update unit 55 to perform processing of setting an update level to be low is inquired.

In FIG. 15, the CPU of the mini-batch learning apparatus according to the second embodiment functions as a reception unit 70 in addition to each of the processing units 50 to 55 according to the first embodiment. In a case where a rare class is specified by the specifying unit 52, the reception unit 70 receives a selection instruction as to whether or not to cause the update unit 55 to execute processing of setting the update level to be low.

In the second embodiment, in a case where the rare class is specified by the specifying unit 52, an inquiry screen 71 is displayed on the display 34. On the inquiry screen 71, a message 72 indicating that the rare class is specified and inquiring whether or not to perform processing of setting the update level of the model 10 to be low, a Yes button 73, and a No button 74 are displayed. The reception unit 70 receives a selection instruction of the Yes button 73 and the No button 74, as a selection instruction as to whether or not to cause the update unit 55 to perform processing of setting the update level to be low. In a case where the Yes button 73 is selected, processing of setting the update level to be low is performed by the update unit 55. On the other hand, in a case where the No button 74 is selected, processing of setting the update level to be low is not performed by the update unit 55.

In generation of the annotation image, since the class is manually designated, the class may be incorrectly designated. Further, although classes are designated in early stage of development of the model 10, some classes may become less important as the development progresses. In such a case, although the rare class is specified by the specifying unit 52, it may not be necessary to perform processing of setting the update level of the model 10 to be low.

For this reason, in the second embodiment, the reception unit 70 receives a selection instruction as to whether or not to cause the update unit 55 to perform processing of setting the update level of the model 10 to be low. Therefore, in a case where the rare class is specified by the specifying unit 52 but it may not be necessary to perform processing of setting the update level of the model 10 to be low, it is possible to deal with the case.

In each embodiment, phase-contrast-microscope images in which a state of cell culture appears are exemplified as the input image 16 and the learning input image 20, and the differentiated cells and the medium are exemplified as the classes. On the other hand, the present disclosure is not limited thereto. For example, magnetic resonance imaging (MRI) images may be used as the input image 16 and the learning input image 20, and organs such as a liver and a kidney may be used as the classes.

The model 10 is not limited to U-Net, and may be another convolutional neural network, for example, SegNet.

As a method of setting the update level of the model 10 to be low, a method other than the method of setting the learning coefficient $\eta$ to be small may be adopted.

The hardware configuration of the computer including the mini-batch learning apparatus 2 may be modified in various ways. For example, the mini-batch learning apparatus 2 may be configured by a plurality of computers which are separated as hardware for the purpose of improving processing capability and reliability. Specifically, the functions of the generation unit 50, the calculation unit 51, and the specifying unit 52, and the functions of the learning unit 53, the evaluation unit 54, and the update unit 55 may be distributed to two computers. In this case, the mini-batch learning apparatus 2 is configured with two computers.

In this way, the hardware configuration of the computer may be appropriately changed according to the required performance such as processing capability, safety, and reliability. Further, not only hardware but also the application program such as an operation program 40 may be duplicated or distributed and stored in a plurality of storage devices for the purpose of ensuring safety and reliability.

In each embodiment, for example, as a hardware structure of the processing unit that executes various processing such as pieces of processing by the generation unit 50, the calculation unit 51, the specifying unit 52, the learning unit 53, the evaluation unit 54, the update unit 55, and the reception unit 70, the following various processors may be used. The various processors include, as described above, a central processing unit (CPU) which is a general-purpose processor that functions as various processing units by executing software (an operation program 40), a programmable logic device (PLD) such as a field programmable gate array (FPGA) which is a processor capable of changing a circuit configuration after manufacture, a dedicated electric circuit such as an application specific integrated circuit (ASIC) which is a processor having a circuit configuration specifically designed to execute specific processing, and the like.

One processing unit may be configured by one of these various processors, or may be configured by a combination of two or more processors having the same type or different types (for example, a combination of a plurality of FPGAs or a combination of a CPU and an FPGA). Further, the plurality of processing units may be configured by one processor.

As an example in which the plurality of processing units are configured by one processor, firstly, as represented by a computer such as a client and a server, a form in which one processor is configured by a combination of one or more CPUs and software and the processor functions as the plurality of processing units may be adopted. Secondly, as represented by a system on chip (SoC) or the like, a form in which a processor that realizes the function of the entire system including the plurality of processing units by one integrated circuit (IC) chip is used may be adopted. As described above, the various processing units are configured by using one or more various processors as a hardware structure.

Further, as the hardware structure of the various processors, more specifically, an electric circuit (circuitry) in which circuit elements such as semiconductor elements are combined may be used.

From the above description, the invention described in following Appendix 1 can be understood.

APPENDIX 1

A mini-batch learning apparatus that learns a machine learning model for performing semantic segmentation, which determines a plurality of classes in an image in units of pixels, by inputting mini-batch data to the machine learning model, the apparatus including:
- a calculation processor configured to calculate an area ratio of each of the plurality of classes in the mini-batch data;
- a specifying processor configured to specify a rare class of which the area ratio is lower than a setting value; and
- an update processor configured to update the machine learning model according to a result of the learning using the mini-batch data and set an update level of the machine learning model in a case where the rare class is specified by the specifying processor to be lower than an update level of the machine learning model in a case where the rare class is not specified by the specifying processor.

The technique of the present disclosure can also appropriately combine the various embodiments and the various modification examples. In addition, the technique of the present disclosure is not limited to each embodiment, and various configurations may be adopted without departing from the scope of the present disclosure. Further, the technique of the present disclosure extends to a program, a storage medium for non-temporarily storing the program, and an image processing apparatus in which the learning apparatus and the program are implemented.

EXPLANATION OF REFERENCES

2: mini-batch learning apparatus
10: machine learning model (model)
10T: learned machine learning model (learned model)
11: mini-batch data
12: divided learning input image group
13: divided annotation image group
14: learning output image group
15: operating apparatus
16: input image
17: output image
20: learning input image
20S: divided learning input image
21: annotation image
21S: divided annotation image
25: frame
30: storage device
31: memory
32: CPU
33: communication unit
34: display
35: input device
36: data bus
40: operation program
50: generation unit
51: calculation unit
52: specifying unit
53: learning unit
54: evaluation unit
55: update unit
60, 61, 65, 66: table
70: reception unit
71: inquiry screen
72: message
73: Yes button
74: No button
DX: movement amount of frame in horizontal direction
DY: movement amount of frame in vertical direction
η: learning coefficient
ST100 to ST180: step

What is claimed is:
1. A mini-batch learning apparatus that learns a machine learning model for performing semantic segmentation, which determines a plurality of classes in an image in units of pixels, by inputting mini-batch data to the machine learning model, the apparatus comprising:
- a calculation unit that calculates an area ratio of each of the plurality of classes in the mini-batch data;
- a specifying unit that specifies a rare class of which the area ratio is lower than a setting value; and
- an update unit that updates the machine learning model according to a result of the learning using the mini-batch data and sets an update level of the machine learning model in a case where the rare class is specified by the specifying unit to be lower than an update level of the machine learning model in a case where the rare class is not specified by the specifying unit.

2. The mini-batch learning apparatus according to claim 1,
wherein the update unit sets a learning coefficient indicating a change range in various parameter values of the machine learning model in a case where the rare class is specified by the specifying unit to be smaller than a learning coefficient in a case where the rare class is not specified by the specifying unit.

3. The mini-batch learning apparatus according to claim 1, further comprising:
a reception unit that receives a selection instruction as to whether or not to cause the update unit to perform processing of setting the update level to be low.

4. The mini-batch learning apparatus according to claim 2, further comprising:
a reception unit that receives a selection instruction as to whether or not to cause the update unit to perform processing of setting the update level to be low.

5. A non-transitory computer readable recording medium storing an operation program of a mini-batch learning apparatus that learns a machine learning model for performing semantic segmentation, which determines a plurality of classes in an image in units of pixels, by inputting mini-batch data to the machine learning model, the program causing a computer to function as:
a calculation unit that calculates an area ratio of each of the plurality of classes in the mini-batch data;
a specifying unit that specifies a rare class of which the area ratio is lower than a setting value; and
an update unit that updates the machine learning model according to a result of the learning using the mini-batch data and sets an update level of the machine learning model in a case where the rare class is specified by the specifying unit to be lower than an update level of the machine learning model in a case where the rare class is not specified by the specifying unit.

6. An operation method of a mini-batch learning apparatus that learns a machine learning model for performing semantic segmentation, which determines a plurality of classes in an image in units of pixels, by inputting mini-batch data to the machine learning model, the method comprising steps of:
calculating an area ratio of each of the plurality of classes in the mini-batch data;
specifying a rare class of which the area ratio is lower than a setting value; and
updating the machine learning model according to a result of the learning using the mini-batch data and setting an update level of the machine learning model in a case where the rare class is specified in the specifying step to be lower than an update level of the machine learning model in a case where the rare class is not specified in the specifying step.

7. An image processing apparatus that learns a machine learning model for performing semantic segmentation, which determines a plurality of classes in an image in units of pixels, by inputting mini-batch data to the machine learning model, the apparatus being configured to:
calculate an area ratio of each of the plurality of classes in the mini-batch data;
specify a rare class of which the area ratio is lower than a setting value; and
set an update level of the machine learning model in a case where the rare class is specified to be lower than an update level of the machine learning model in a case where the rare class is not specified.

* * * * *